April 11, 1961 A. C. DE WILDE ET AL 2,979,643
SOLENOID VALVE ASSEMBLY
Filed May 29, 1957

INVENTOR.
William K. Steinhagen
Andries C. DeWilde
BY
D. C. Staley
Their Attorney

United States Patent Office 2,979,643
Patented Apr. 11, 1961

2,979,643

SOLENOID VALVE ASSEMBLY

Andries C. de Wilde, Warren, and William K. Steinhagen, Royal Oak, Mich., assignors to General Motors Corporation, Detroit, Mich., a corporation of Delaware Filed May 29, 1957, Ser. No. 662,469

9 Claims. (Cl. 317—199)

This invention pertains to solenoid assemblies, and particularly to a positioning type solenoid valve assembly.

In modulating-type gas heating systems, the flow of gas is controlled by an electric control system in such a way that a substantially constant temperature is maintained, hence, the heat flow is modulated to compensate the actual heat loss at the desired temperature level to be maintained. The present invention relates to a positioning type solenoid valve wherein the position of the valve plunger is dependent upon the applied voltage, preferably alternating current although direct current may be used, and which may be used in the modulating valve control system disclosed in copending application, Serial No. 662,468, filed of even date herewith in the name of Andries C. de Wilde, and assigned to the assignee of this invention, and now Patent No. 2,949,237.

Accordingly, among our objects are the provision of a positioning type solenoid assembly; the further provision of a solenoid valve having a plunger positioned by leakage magnetic flux; and the still further provision of a solenoid valve having a reciprocable plunger wherein the position of the plunger is determined by the magnitude of the applied voltage, and hence also the current flowing through the solenoid.

The aforementioned and other objects are accomplished in the present invention by utilizing leakage magnetic flux positioning to obtain variation in the gas flow correspondng to variations in applied voltage. Specifically, the solenoid valve assembly comprises a valve body of non-magnetic material having an inlet port and an outlet port. The flow of gas through the outlet port is controlled by a tapered valve portion formed on the end of a plunger composed of nonmagnetic material. The plunger has a sleeve, or cylinder, of magnetic material press fitted thereon, and is supported for reciprocable movement in a solenoid housing attached to the valve body.

The solenoid housing includes an annular shell and end plates of magnetic material within which a solenoid coil having a nonmagnetic cylindrical spool is disposed. One of the end plates has an annular bearing formation integral therewith that extends into the valve body. The plunger assembly is supported for reciprocable movement within the main magnetic end plate by a pair of spaced bearing rings carried by the bearing formation. The other end plate of the solenoid housing has a threaded hole therein which receives an adjustable spring seat. A coil spring is positioned between the spring seat and the plunger assembly, and after the valve spring is calibrated by adjusting the position of the spring seat, the hole in the end plate is sealed by an end cap.

The magnetic flux, produced upon energizing of the solenoid with an electric current, is concentrated into the bearing carrying end plate; passes through the air gap between this end plate and the plunger cylinder to return out of the end of this cylinder, of magnetic material, back into the coil windings. The flux is used to position the plunger assembly by balancing the magnetic leakage flux against the force of the backing spring. The magnetic leakage flux is increased, when the voltage applied to the solenoid is increased, hence, an increased magnetic force is applied to the plunger assembly, which assembly has to move against the spring in order to find a new position of balance to compensate for the increased force.

Further objects and advantages of the present invention will be apparent from the following description, reference being had to the accompanying drawing wherein preferred embodiments of the present invention are clearly shown.

Figure 2:
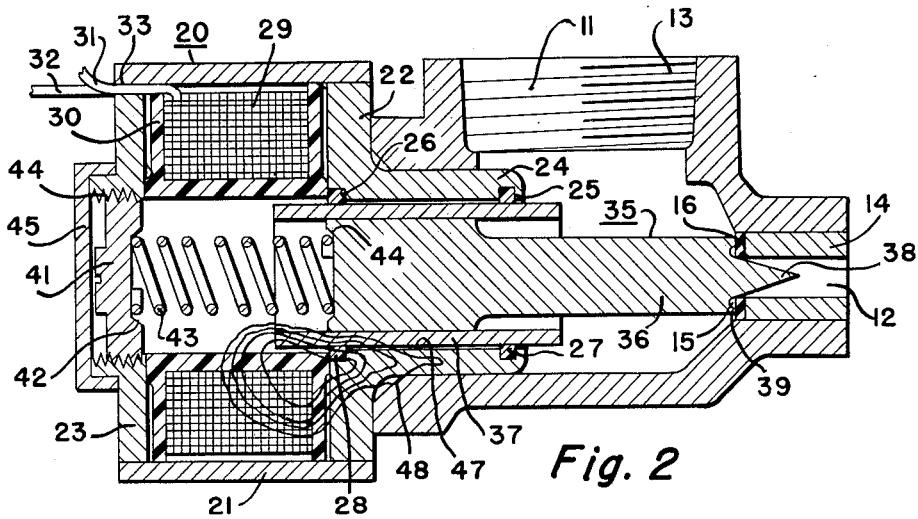
Figure 2 is a sectional view taken along line 2—2 of Figure 1.
Figure 1:
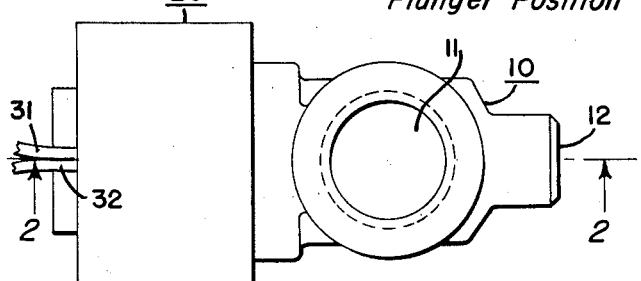
Figure 1 is a plan view of a solenoid valve assembly constructed according to this invention.

With particular reference to Figure 1, a solenoid valve assembly is shown including a valve body 10 composed of nonmagnetic material, such as aluminum having an inlet connection 11 and an outlet port 12. The valve body 10 has attached thereto a solenoid housing 20 of magnetic material, such as soft steel. As seen in Figure 2, the inlet port 11 of the valve body is formed with suitable internal threads 13 for receiving a pipe fitting. The outlet port 12 has a sleeve 14 press fitted therein with an annular groove 15 at the inner end thereof within which a sealing ring 16 is disposed.

The solenoid housing assembly includes an annular shell 21 which is connected by suitable means, such as pressing, to a pair of end plates 22 and 23. The end plate 22 is formed with an axially extending cylindrical bearing formation 24 which extends into the valve body 10. Preferably the bearing formation 24 of the end plate 22 is press fitted into the valve body 10 so as to obtain a gas tight joint. The bearing formation 24 is formed with a pair of spaced annular grooves 25 and 26 within which bearing rings 27 and 28, respectively, are disposed. An annular solenoid coil 29 is disposed within the solenoid housing, the coil being wound on a suitable nonmagnetic cylindrical spool 30, one end of which engages the bearing ring 28. The lead wires 31 and 32 of the solenoid coil 29 extend through a slot 33 in the end plate 23.

A plunger assembly having portions disposed in the valve body 10 and the solenoid housing 20, is denoted by the numeral 35 and comprises a plunger 36 of nonmagnetic material such as aluminum, having press fitted thereon a sleeve 37 of magnetic material, such as soft steel. The plunger 36 has a tapered valve portion 38 which, as shown in Figure 2, extends into the outlet port 12. The tapered valve portion 38, together with the opening 12 of sleeve 14, provides a controlled annular opening to the gas flow; thus regulating said gas flow depending upon the physical position of the plunger with respect to the opening 12. The plunger also includes a shoulder 39 arranged to engage the seal 16 so as to completely close the outlet port 12. The plunger assembly 35 is supported for reciprocable movement within the bearing formation 24 by the spaced bearing rings 27 and 28. A portion of the sleeve 37 is always disposed within the spool 30 of the solenoid coil 29.

The end plate 23 has a threaded opening 40 therein which receives a nut 41. The nut 41 is formed with a spring seat 42 engaged by one end of a coil spring 43. The other end of the coil spring 43 engages a spring seat 44 formed on the plunger 36. The nut 41 can be adjusted relative to the end plate 23 to vary the force of the spring 43 which biases the plunger towards a closed valve position. After the force of spring 43 has been calibrated, an end cap 45 is attached to the end plate 23 so as to close the opening 40.

Upon energizing the solenoid coil 29, by applying a suitable voltage, a magnetic flux is generated by the corresponding current flowing through the windings of the coil, which magnetic flux forms what is called a leakage flux, mainly passing through the end plate 22 into its axial extension and then through the air gap 47, between this axial extension and the sleeve 37, on the plunger; following this sleeve axially to, again, pass into the air at the end of the sleeve; distribute through the coil windings to close the flux path. Such a flux path is illustrated by lines numbered 48. This leakage magnetic flux is directly proportional to the applied voltage. The magnetic force, due to the applied voltage, is balanced by the force of the coil spring 43. Hence, an increased magnetic force impels the plunger assembly to move to the left to seek a position with an increased spring force equal to the magnetic force induced. The movement of the plunger assembly, in turn, increases the opening for gas flow and, hence, the new position allows more gas to flow to the heating furnace. The annular air gap 47 between the bearing formation 24 and the sleeve 37 remains constant, or fixed, irrespective of the position of the plunger assembly relative to the solenoid housing. The distance between the end plate 23 and the left hand end of the plunger assembly 35, as viewed in Figure 2, is substantially greater than the total travel of the plunger assembly. Accordingly, the influence of any magnetic flux which might exist between the end plate 23 and the left hand end of the plunger is insignificant in comparison to the leakage flux which passes through the fixed air gap 47 as shown by the lines numbered 48.

Figure 3:
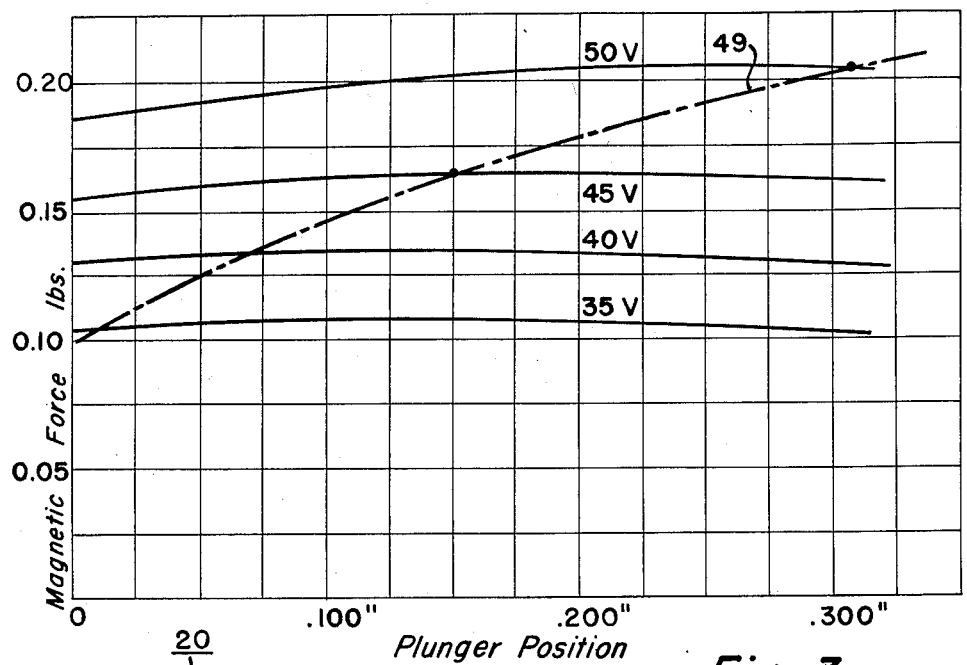
Figure 3 is a graph depicting the electromagnetic characteristics of the solenoid valve assembly.

With particular reference to the graph shown in Figure 3, the force of the spring 43 is originally adjusted so that the shoulder 39 is .150" from the valve seat constituted by a seal 16 of the applied voltage of 45 volts. Thereafter, as shown in the graph, as the voltage is varied from 35 volts to 50 volts the valve plunger will move from a fully closed position to a fully open position responding to the change of the applied voltage. The balance, between the spring force and the leakage magnetic flux force, positions the plunger, and thus, the size of the annular opening presented to the gas flow. It is possible to make the resulting gas flow correspond to any desired curve by proper shaping of the taper 38 on the plunger.

In the graph of Figure 3, the plunger position is plotted against the magnetic force, and the relationship between magnetic force and the applied voltage depicted by the curves on the graph depicted by the indicia 35 v., 40 v., 45 v., and 50 v. From the latter curves it is seen that the magnetic force of the leakage flux is substantially constant irrespective of the position of the plunger, while a substantially linear relationship exists between the magnetic force produced by the leakage flux and the position of the plunger as depicted by curve 49.

The solenoid coil 29 can be energized by either alternating current or direct current. However, it is preferred to energize the coil 29 with alternating current since alternating current causes a slight axial vibratory movement of the plunger and reduces the friction between the sleeve 37 and the bearing rings 27 and 28. Another advantage, in using alternating current instead of direct current, is that continuous and automatic demagnetizing of the material used results in a precise positioning without deterrent residual magnetism endangering a repositioning.

While the embodiment of the invention as herein disclosed constitutes a preferred form, it is to be understood that other forms might be adopted, as may come within the scope of the claims which follow.

What is claimed is as follows:

1. A positioning type solenoid assembly including, a solenoid housing of magnetic material having an annular extension at one end, a reciprocable plunger assembly disposed within said solenoid housing, said plunger assembly including a body portion of nonmagnetic material and a sleeve of magnetic material attached thereto, said sleeve being radially spaced from the annular extension of said housing to form a fixed annular air gap therebetween irrespective of the position of the plunger assembly, a solenoid coil disposed within said housing having a guide within which a portion of said sleeve is disposed whereby the plunger assembly is positioned by the magnetic force of leakage flux from said coil passing through said fixed air gap in proportion to the voltage applied to said coil, and resilient means engaging said plunger assembly and balancing said magnetic force at predetermined positions.

2. A positioning type solenoid assembly including, a solenoid housing of magnetic material having an annular extension at one end, a reciprocable plunger assembly disposed within said solenoid housing including a body portion of nonmagnetic material and a sleeve of magnetic material encompassing part of said body portion, said sleeve being radially spaced from the annular extension of said housing to form a fixed annular air gap therebetween irrespective of the position of said plunger assembly, a solenoid coil disposed within said housing having a cylindrical guide within which a portion of said sleeve is disposed whereby the plunger assembly is positioned by the magnetic force of leakage flux from said coil passing through said fixed air gap in proportion to the voltage applied to said coil, and resilient means disposed within said cylindrical guide having one end engaging the body portion of said housing and the other end engaging said plunger assembly for balancing said magnetic force at predetermined positions.

3. A positioning type solenoid assembly including, a solenoid housing of magnetic material having an annular extension at one end, a reciprocable plunger assembly disposed within said solenoid housing including a body portion of nonmagnetic material and a sleeve of magnetic material, said sleeve being radially spaced from the annular extension of said housing to form a fixed annular air gap therebetween irrespective of the position to said plunger assembly, a solenoid coil disposed within said housing having a cylindrical guide within which a portion of said sleeve is disposed whereby the plunger assembly is positioned by the magnetic force of leakage flux from said coil passing through said fixed air gap in proportion to the voltage applied to said coil, resilient means disposed within said cylindrical guide having one end engaging the body portion of said plunger assembly for opposing movement thereof by said magnetic force, and an adjustable spring seat carried by said housing and engaging the other end of said resilient means.

4. A positioning type solenoid assembly including, a solenoid housing of magnetic material comprising a pair of spaced end plates and an annular shell attached thereto, one end of said end plates having an axially extending bearing formation thereon, a pair of spaced bearing rings carried by said bearing formation, a reciprocable plunger assembly supported by said bearing rings including a body portion of nonmagnetic material and a sleeve of magnetic material attached thereto, said sleeve being radially spaced from said bearing formation by said bearing rings to form a fixed annular air gap therebetween irrespective of the position of said plunger assembly, a solenoid coil disposed within said housing having a cylindrical guide within which a portion of said sleeve is disposed whereby the plunger assembly is positioned by the magnetic force of leakage flux from said coil passing through said fixed air gap in proportion to the voltage applied to said coil, and resilient means engaging said plunger assembly for opposing movement thereof by said magnetic force.

5. A positioning type solenoid assembly including, a solenoid housing of magnetic material comprising a pair of spaced end plates and an annular shell attached thereto, one end of said end plates having an axially extending bearing formation thereon, a reciprocable plunger assembly supported by said bearing formation including a body portion of nonmagnetic material and a sleeve of magnetic material attached thereto, said sleeve being radially spaced from said bearing formation to form a fixed annular air gap therebetween irrespective of the position of said plunger assembly, a solenoid coil disposed within said housing having a cylindrical guide within which a portion of said sleeve is disposed whereby the plunger assembly is positioned by the magnetic force of leakage flux from said coil passing through said fixed air gap in proportion to the voltage applied to said coil, resilient means disposed within said cylindrical guide having one end engaging said plunger assembly for balancing the magnetic force by the resilient force, and an adjustable spring seat carried by said other end plate engaging the other end of said resilient means.

6. A positioning type solenoid assembly including, a solenoid housing of magnetic material comprising a pair of spaced end plates and an annular shell attached thereto, one of said end plates having an axially extending bearing formation thereon, a reciprocable plunger assembly supported by said bearing formation including a body portion of nonmagnetic material and a sleeve of magnetic material attached thereto, said sleeve of magnetic material being radially spaced from said bearing formation so as to form a fixed annular air gap therebetween irrespective of the position of said plunger assembly, a solenoid coil disposed within said housing having a cylindrical guide within which a portion of said sleeve is disposed, said plunger assembly being positioned by the magnetic force of leakage flux from said coil, said leakage flux passing through said one end plate having the bearing formation thereon, through the bearing formation, through the fixed annular air gap, and through said sleeve whereby the position of said plunger assembly is determined by the voltage applied to the solenoid coil, and resilient means engaging said plunger assembly for opposing movement thereof by said leakage flux.

7. A positioning type solenoid assembly including, a solenoid housing of magnetic material having an annular extension at one end, a sleeve of magnetic material supported for reciprocation relative to said housing, said sleeve being radially spaced from the annular extension of said housing to form a fixed annular air gap therebetween irrespective of the position of said sleeve, an electromagnetic coil within said housing which, when energized, produces magnetic leakage flux which passes through said fixed air gap and acts on said sleeve with a magnetic force proportional to the voltage applied to said coil, and resilient means operatively engaging said sleeve for opposing movement thereof under the urge of said magnetic force.

8. The positioning solenoid assembly set forth in claim 7 wherein said solenoid housing comprises a pair of spaced end plates and an annular shell attached thereto, wherein said annular extension is integral with one of said end plates, and wherein the distance between said other end plate and said sleeve is appreciably greater than the total travel of said sleeve.

9. The positioning solenoid assembly set forth in claim 7 wherein said electromagnetic coil includes a cylindrical guide within which a portion of said sleeve is disposed, wherein said resilient means comprises a coil spring, and wherein said solenoid housing supports an adjustable spring seat for varying the stress of said spring.

References Cited in the file of this patent
UNITED STATES PATENTS

| | | |
|---|---|---|
| 907,161 | Moore | Dec. 22, 1908 |
| 1,341,629 | Brown | June 1, 1920 |
| 1,389,625 | Churchward | Sept. 6, 1921 |
| 1,538,092 | Cohen | May 19, 1925 |
| 1,987,981 | Tice | Jan. 15, 1935 |
| 2,040,964 | Tarleton | May 19, 1936 |
| 2,405,454 | Scott | Aug. 6, 1946 |
| 2,579,723 | Best | Dec. 25, 1951 |
| 2,805,689 | Groat | Sept. 10, 1957 |
| 2,829,319 | McCleskey | Apr. 1, 1958 |